United States Patent [19]

Zimics et al.

[11] Patent Number: 5,470,647

[45] Date of Patent: Nov. 28, 1995

[54] PREPREGS COMPRISING A FIBROUS BASE WITH A FIRST COATING OF C-STAGE THERMOSETTING RESIN AND AN OUTER SECOND COATING OF B-STAGE THERMOSETTING RESIN AND A METHOD OF MAKING THE SAME

[75] Inventors: Bela Zimics, Tobelbad; Willibald Orthofer, Wundschuh, both of Austria

[73] Assignee: Isovolta Osterreichische Isolierstoffwerke Aktiengesellschaft, Austria

[21] Appl. No.: 170,277

[22] PCT Filed: May 13, 1993

[86] PCT No.: PCT/AT93/00082

§ 371 Date: Jan. 5, 1994

§ 102(e) Date: Jan. 5, 1994

[87] PCT Pub. No.: WO93/23461

PCT Pub. Date: Nov. 25, 1993

[30] Foreign Application Priority Data

May 15, 1992 [AT] Austria ................................ 990/92

[51] Int. Cl.⁶ .......................... B32B 31/08; B32B 7/00; B05D 5/12; B05D 1/36

[52] U.S. Cl. .................. 428/229; 156/162; 156/164; 156/182; 427/116; 427/379; 427/381; 427/386; 427/389.7; 427/402; 427/407.03; 428/251; 428/246; 428/902

[58] Field of Search .................. 428/246, 252, 428/260, 261, 273, 286, 902; 427/116, 379, 381, 386, 389.7, 402, 407.3; 156/162, 164, 182

[56] References Cited

U.S. PATENT DOCUMENTS

| 3,660,220 | 5/1972 | Groff ........................ 428/251 |
| 3,881,978 | 5/1975 | Livingston et al. ......... 156/247 |
| 4,024,305 | 5/1977 | Alpaugh et al. ............ 427/381 |
| 4,447,797 | 5/1984 | Saunders et al. ........... 428/383 |
| 4,803,101 | 2/1989 | Roberts et al. ............. 428/116 |
| 5,212,234 | 5/1993 | Van Gasse et al. ......... 525/43 |

FOREIGN PATENT DOCUMENTS 2216435  10/1989  United Kingdom ............. B05D 1/36

OTHER PUBLICATIONS

Patent Abstracts of Japan, vol. 11, No. 94 (M–547) (2541), JP 61–246050 dated 1 Nov. 1986, Shin Kobe Electric Mach. Co., Ltd.

*Primary Examiner*—James D. Withers
*Attorney, Agent, or Firm*—Bacon & Thomas

[57] ABSTRACT

The invention concerns a compressible prepreg based on flat substrates impregnated with thermosetting synthetic resins, characterized in that it comprises a first, C stage synthetic-resin layer directly deposited on the substrate and a second, B stage synthetic-resin layer deposited on the first synthetic-resin layer.

14 Claims, 2 Drawing Sheets

PREPREGS COMPRISING A FIBROUS BASE WITH A FIRST COATING OF C-STAGE THERMOSETTING RESIN AND AN OUTER SECOND COATING OF B-STAGE THERMOSETTING RESIN AND A METHOD OF MAKING THE SAME

TECHNICAL FIELD OF THE INVENTION

The invention concerns a compressible prepreg based on flat substrates impregnated with thermosetting synthetic resins, further a method for its manufacture and its application.

BACKGROUND OF THE INVENTION

Such prepregs are used when making electrical insulation for transformer windings and as a rule consist of a substrate, for instance a fiberglass fabric impregnated with a thermosetting synthetic resin.

When manufacturing said insulation, these prepregs are deposited for instance in tape form on a metal strip and while applying high tension are wound on a mandrel which then is moved into a heated oven. The prepreg synthetic resin in the B stage is then converted at these higher temperatures into the C stage. However, this metal-prepreg compound being under high tension, it may happen, especially where the metal sites are uneven, that the resin will flow out of the fiberglass fabric before curing, as a result of which unimpregnated layers of fiberglass will be present between the metal layers. In that case, shorts will occur at the first use of the transformer windings.

SUMMARY OF THE INVENTION

Accordingly it is the object of the invention to create a compressible prepreg of the initially cited kind which when used as electrical insulation will be free of the above drawbacks.

The prepreg of the invention is characterized in that it comprises a first layer of synthetic resin in the C stage which is directly deposited on the flat substrate and a second layer of synthetic resin in the B stage which is deposited on the first layer of synthetic resin.

The invention offers the further advantage that the flat substrate for the prepreg is an organic-fiber fabric where said fibers are aramide fibers.

In another embodiment of the invention, the flat substrate for the prepreg is a web of inorganic fibers which are glass fibers.

Yet another advantage of the invention is that the prepreg comprises a substrate in the form of organic fibers which are aramide fibers.

Still another advantageous embodiment of the invention is that the flat prepreg support is a web of inorganic fibers, said inorganic fibers being glass fibers.

Yet another advantage of the invention is that the thermosetting synthetic resin is an epoxy resin or a polyester resin.

The prepreg of the invention is manufactured by a method characterized in that the flat substrate is moved into a first bath filled with a solution of curable synthetic resin, in that this impregnated substrate is made to pass over several direction-changing rollers in a heating zone during which the synthetic resin is converted into the C stage and in that thereupon this compound moves through a second bath filled with a solution of curable synthetic resin, in the course of which a second adhesive layer of synthetic resin is formed on the compound, and in that this second layer of synthetic resin then is converted into the B stage.

The invention further concerns the application of a prepreg to insulating coils of electrical machinery, the synthetic resin of the second layer of synthetic resin also being converted into the C stage.

DESCRIPTION OF DRAWINGS

The manufacture of the prepreg of the invention is illustratively carried out using equipment shown in FIGS. 1 and 2.

DETAILED DESCRIPTION OF THE INVENTION

Figure 1:
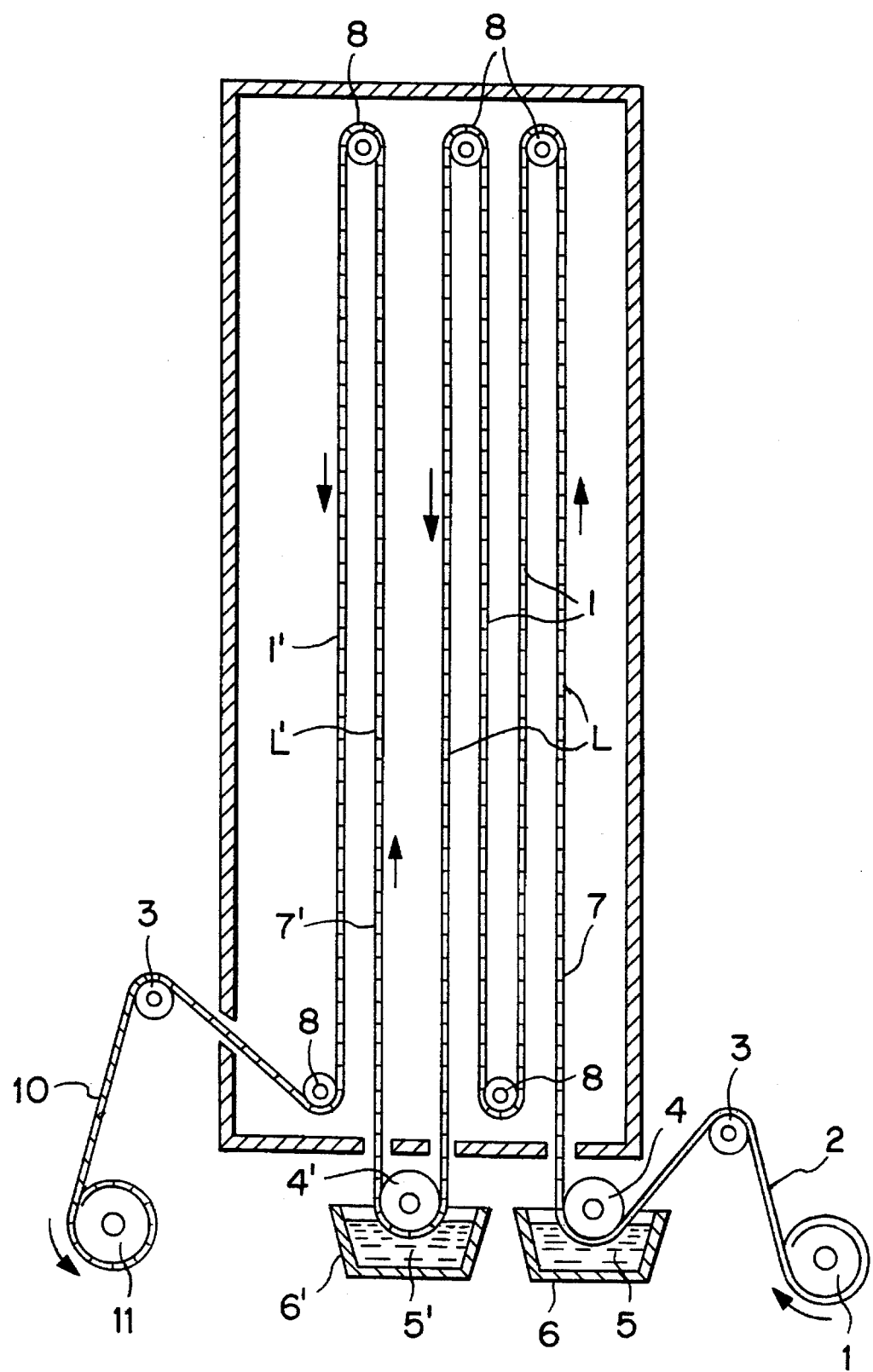
FIG. 1 shows impregnation apparatus consisting of two baths and an impregnation tower.

Illustratively impregnation to manufacture the prepreg of the invention can be carried out with the apparatus shown in FIG. 1.

Illustratively a fiberglass fabric 2 is taken off the supply roll 1 and moved over a drive roller 3 to a deposition roller 4. The deposition roller 4 dips into a bath 6 filled with a solution of curable synthetic resin 5. The synthetic-resin solution 5 may consist for instance of epoxy resins dissolved in ketones, their temperature being kept at ambient during impregnation. Thereupon the compound 7 comprised of fiberglass fabric and synthetic resin is made to pass over several direction-changing rollers 8 in the impregnation tower 9 of which the temperature is kept approximately between 120° and 130° C., the compound 7 traversing the paths L subtended between the deposition rollers and the direction-changing rollers and the paths 1 subtended between two deposition rollers. In the process the synthetic resin penetrates the fiberglass fabric and due to the raised temperature in the impregnation tower is converted into the B stage. Lastly this compound is made to pass over another deposition roller 4' dipping into a bath 6' filled with a curable synthetic-resin solution 5'. This synthetic-resin solution is kept at ambient temperature and its concentration may be the same as that of the synthetic-resin solution 5 or different. Moreover the synthetic-resin solution 5' may comprise a synthetic resin different from that in the solution 5, for instance a polyester resin. Next the compound 7' traverses the path L' subtended between the deposition roller 4' and a direction-changing roller 8, further the path 1' between two direction-changing rollers 8. Because of the raised temperature in the impregnation tower, the layer of synthetic resin that was deposited in the first synthetic-resin solution 5 has been converted into the C stage, whereas the layer of synthetic resin deposited in the form of the second synthetic-resin solution 5' remains in the B stage. Thereupon this prepreg 10 is wound on a take-up spool 11 where it may remain stored until further processing.

Figure 2:
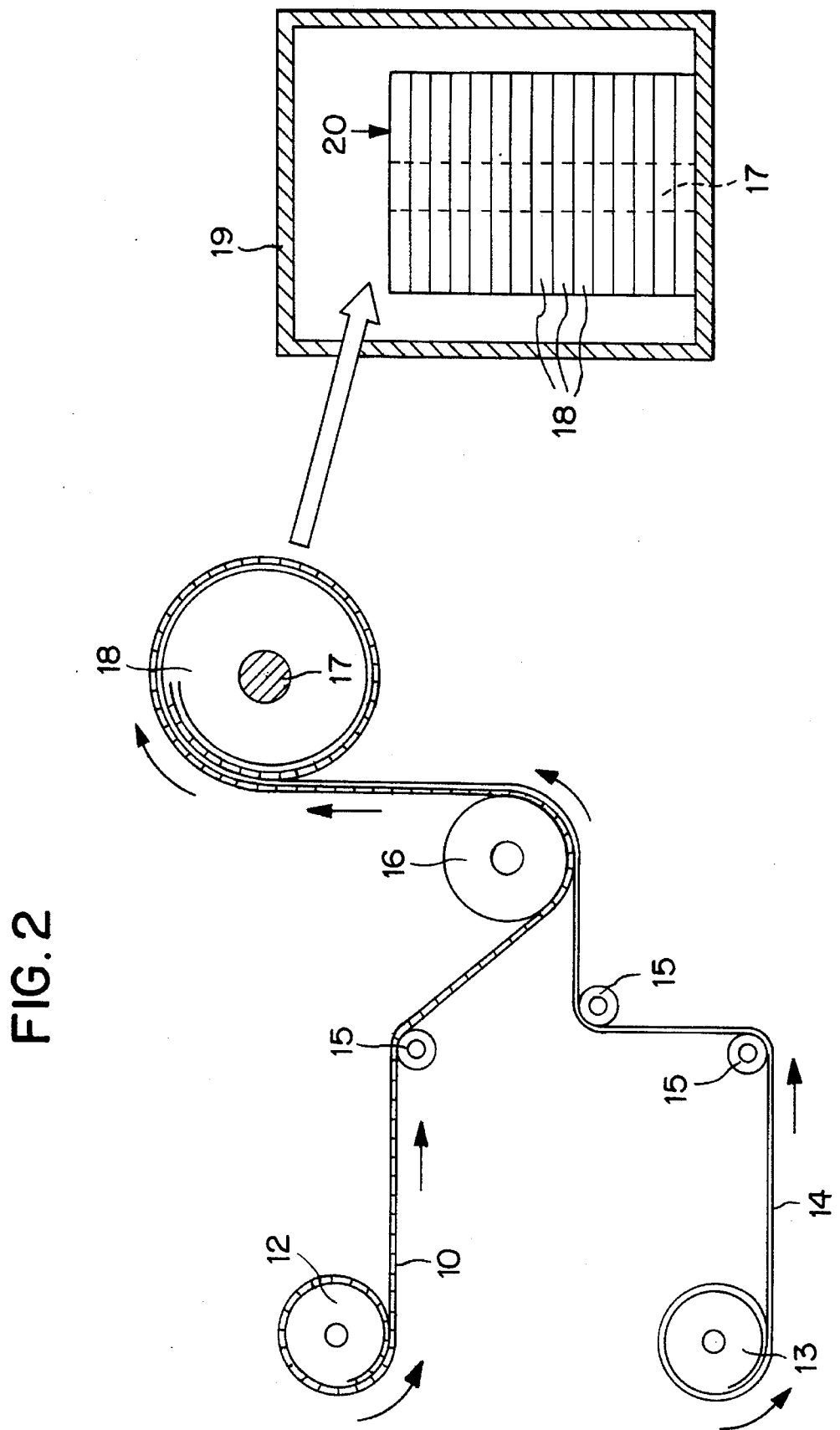
FIG. 2 shows a winding device for a metal foil and the prepreg of the invention, where called for followed by an oven.

The prepregs 10 can be processed further using the apparatus of FIG. 2. Here the prepreg 10 of the invention is taken off a supply roll 12 and a metallic, for example, copper foil 14 is taken off a supply roll 13, and they are moved over drive rollers 15 to the direction-changing roller 16 where the materials 10 and 14 are placed in contact with each other at ambient temperature, after which they are wound on the mandrel 17 as a result of which the materials are under tension. These tensioned metal-prepreg windings 18 are then cut to size and moved into an oven heated to 130° to 160° C., whereby the synthetic-resin layer in the B stage is converted to the C stage. As regards known prepregs evincing merely one layer of synthetic resin, it was found that beyond a given tension, the resin will be squeezed out of the substrate during curing, and thereby the unimpregnated substrate would directly lie on the metal foil, and, where used for instance as transformer windings, shorts were incurred.

Following curing, the end face of winding 20 will be cast and the winding mandrel 17 removed, so that a structure is now available which can be used as transformer windings.

Such prepregs are used to manufacture electrical insulation of transformer windings.

We claim:

1. A compressible prepreg based on flat substrates comprising webs or fabrics of organic or inorganic fiber impregnated with thermosetting synthetic resins comprising epoxy resins or polyester resins, said prepreg comprising a first layer of said synthetic resin in the C stage directly deposited on the substrate and a second layer of said synthetic resin in the B stage directly deposited on the first layer of synthetic resin.

2. Prepreg defined in claim 1, wherein the flat substrate is a fabric of organic fibers.

3. Prepreg defined in claim 2, wherein the organic fibers are aramide fibers.

4. Prepreg defined in claim 1, wherein the flat substrate is a fabric of inorganic fibers.

5. Prepreg defined in claim 4, wherein the inorganic fibers are glass fibers.

6. Prepreg defined in claim 1, wherein the flat substrate is a web of organic fibers.

7. Prepreg defined in claim 6, wherein the organic fibers are aramide fibers.

8. Prepreg defined in claim 1, wherein the flat substrate is a web of inorganic fibers.

9. Prepreg defined in claim 8, wherein the inorganic fibers are glass fibers.

10. Prepreg defined in claim 1, wherein the thermosetting resin is an epoxy resin.

11. Prepreg defined in claim 1, wherein the thermosetting synthetic resin is a polyester resin.

12. A method of making a compressible prepreg comprising:
   i) impregnating a flat substrate comprised of a web or fabric of organic or inorganic fibers, with a first thermosetting synthetic resin comprised of an epoxy or polyester resin;
   ii) heating said impregnated substrate to convert said first thermosetting synthetic resin to the C stage;
   iii) applying a second thermosetting synthetic resin comprised of an epoxy or polyester resin, to said impregnated substrate; and
   iv) heating said second thermosetting resin to convert it to the B stage.

13. A method of making electrically insulated metal windings for electrical machinery comprising:
   a) contacting a compressible prepreg with a metal strip under tension to form a metal-prepreg winding, said compressible prepreg being formed by:
      i) impregnating a flat substrate comprised of a web or fabric of organic or inorganic fibers, with a first thermosetting synthetic resin;
      ii) heating said impregnated substrate to convert said first thermosetting synthetic resin to the C stage;
      iii) applying a second thermosetting synthetic resin to said impregnated substrate; and
      iv) heating said second thermosetting synthetic resin to convert it to the B stage; and
   b) heating the metal-prepreg winding to convert said second thermosetting synthetic resin from the B stage to the C stage.

14. An electrically insulated metal winding for electrical machinery made by the method of claim 13.

* * * * *